(12) United States Patent
Blair (10) Patent No.: US 11,619,137 B1
(45) Date of Patent: Apr. 4, 2023

(54) CMAS TRAPS FOR GAS TURBINE ENGINES (71) Applicant: Rolls-Royce Corporation, Indianapolis, IN (US)

(72) Inventor: Taylor K. Blair, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/646,508

(22) Filed: Dec. 30, 2021

(51) Int. Cl.
| | |
|---|---|
| *F01D 5/28* | (2006.01) |
| *F01D 9/04* | (2006.01) |
| *F01D 25/10* | (2006.01) |
| *F23R 3/00* | (2006.01) |

(52) U.S. Cl.
CPC .............. *F01D 5/288* (2013.01); *F01D 9/041* (2013.01); *F01D 25/10* (2013.01); *F23R 3/002* (2013.01); *F05D 2230/90* (2013.01); *F05D 2240/35* (2013.01); *F05D 2260/232* (2013.01); *F05D 2260/607* (2013.01); *F05D 2300/211* (2013.01); *F05D 2300/6111* (2013.01)

(58) Field of Classification Search
CPC .......... F01D 5/288; F01D 9/041; F01D 25/10; F23R 3/002; F05D 2230/90; F05D 2240/35; F05D 2260/232; F05D 2260/607; F05D 2300/211; F05D 2300/6111
See application file for complete search history.

(56) References Cited

U.S. PATENT DOCUMENTS

| | | | | |
|---|---|---|---|---|
| 8,439,639 | B2* | 5/2013 | Joe | ........................ F01D 11/08 |
| | | | | 415/115 |
| 9,708,929 | B2* | 7/2017 | Szwedowicz | ........... F01D 25/02 |
| 10,399,911 | B2 | 9/2019 | Shim et al. | |
| 10,801,353 | B2 | 10/2020 | Lutjen et al. | |
| 10,934,220 | B2 | 3/2021 | Mikalsen et al. | |
| 2004/0115471 | A1* | 6/2004 | Nagaraj | ................... C23C 4/02 |
| | | | | 428/210 |
| 2016/0369637 | A1 | 12/2016 | Subramanian et al. | |
| 2018/0282851 | A1* | 10/2018 | Ndamka | ............... C23C 28/321 |
| 2018/0363553 | A1* | 12/2018 | Durham | ................. F01D 9/065 |
| 2022/0025523 | A1* | 1/2022 | Tolpygo | ............. C23C 28/3215 |

FOREIGN PATENT DOCUMENTS

| | | |
|---|---|---|
| CN | 111424242 B | 7/2020 |
| CN | 112126889 A | 12/2020 |
| JP | 5767248 B2 | 8/2015 |
| WO | 2011085376 A1 | 7/2011 |

OTHER PUBLICATIONS

U.S. Appl. No. 17/646,551, filed Dec. 30, 3021, naming inventors Blair et al.

* cited by examiner

*Primary Examiner* — J. Todd Newton
(74) *Attorney, Agent, or Firm* — Shumaker & Sieffert, P.A.

(57) ABSTRACT

A gas turbine engine includes at least one trap that absorbs or adheres to calcium-magnesium-alumino-silicate (CMAS) entrained in intake air entering the engine.

16 Claims, 9 Drawing Sheets

CMAS TRAPS FOR GAS TURBINE ENGINES

BACKGROUND

Gas turbine engines, which include, for example, turbofan, turbojet, turboshaft, and turboprop engines, provide energy for a wide range of uses. A typical gas turbine engine includes a compressor section, a combustor, and a turbine section with a high-pressure turbine and a low-pressure turbine. These components are typically contained within a casing that defines both an internal flow path of air through the engine, and the external dimensions of the engine. In some applications, additional components are included to define all or part of the internal flow path.

The components of gas turbine engines operate in severe environments. For example, some components exposed to hot gases in commercial aeronautical engines may experience surface temperatures in excess of about 1200° C. At these extreme temperatures, component substrates may be exposed to environmental species such molten Calcium-Magnesium-Alumino-Silicate (CMAS) containing materials, which can cause chemical and/or mechanical damage to the internal parts of the engine.

Turbine components may be deleteriously attacked from molten materials (e.g. CMAS) due to the higher operating conditions of the engine and engine operation in regions with greater concentrations of CMAS on the ground and in the air. For example, the presence of CMAS in the high temperature environments of a gas turbine engine may result from the ingestion of siliceous minerals (e.g., airborne dust, sand, volcanic dust and ashes, fly ash, runway debris, concrete dust, fuel residue, and the like) in the intake gas drawn through the gas turbine engine. For example, when siliceous debris such as sand and dust is ingested into the engine, it can melt and deposit on hot section components (e.g. seal segments, vanes and blades). These partially or fully molten deposits are commonly referred to as CMAS because the primary oxide constituents are CaO, MgO, $Al_2O_3$ and $SiO_2$. Once molten CMAS has deposited on the surface of components, the CMAS may dissolve, react with, and/or infiltrate the coating system which may lead to coating recession and/or spallation.

In gas turbine engines, increasing demands for greater operating efficiency (e.g., fuel efficiency) has led to the operation of gas turbine engines at higher temperatures. Since ceramic matrix composite (CMC) components can potentially operate a higher temperatures compared to other materials, CMCs are increasingly specified for use as components for gas turbine engines. CMC components in gas turbine engines are also susceptible to damage from CMAS, and the higher operating temperatures at which CMCs operate the potential damage from CMAS can shorten component life or cause catastrophic failure of a part.

Since CMAS melts at the higher operating temperatures of CMC components, the molten CMAS can react more readily with protective environmental barrier coatings (EBC) on the CMC parts, which has constrained operating temperatures or required expensive layered coatings to resist or delay the chemical or mechanical damage CMAS causes coatings and parts. Given sufficient time in contact with a coating in a specific region of a turbine engine, the molten CMAS can infiltrate and/or react with the EBC on a CMC part. In addition, engine cooling air contaminated by CMAS and dust can circumvent the external coating protection provided by an EBC on a CMC part.

SUMMARY

In general, the present disclosure is directed to a least one trap that is susceptible to absorbing, adheres to, or resists penetration of, calcium-magnesium-alumino-silicate (CMAS) entrained in intake air traversing a flow path within a gas turbine engine. In various examples, the CMAS trap may be located in any or all of the compression section, the combustion section, or the turbine section of the gas turbine engine.

In some examples, the CMAS trap is a diverter in the intake air flow path that includes at least one of a CMAS-susceptible coating, a CMAS-adhering coating, a CMAS-resisting coating, or a CMAS particulate filter. In other examples, the CMAS trap is a CMAS-susceptible or CMAS-adhering coating on an engine component, or on a specific portion of an engine component, in the flow path such as, for example, a surface of the combustor, or a surface of a compressor vane or a turbine vane. In some examples, the engine component, the CMAS trap, or both, may optionally be heated to raise the temperature of the CMAS-susceptible or CMAS-adhering coating to a predetermined temperature to more efficiently capture and trap CMAS.

In some examples, the CMAS traps of the present disclosure can delay or prevent CMAS damage to turbine engine components, and can potentially prolong the operating life of these components. The reduced damage can, in some cases, make possible a higher engine operating temperature, which can provide greater overall turbine engine efficiency. In some examples, the CMAS traps of the present disclosure can render unnecessary certain specialized coatings on turbine engine pails, which can potentially reduce engine costs. In some cases, the CMAS traps of the present disclosure can make CMAS resistance a less important design criterion for the critical rotating components of the turbine engine, which can enable more efficient component designs and potentially reduce costs.

In one aspect, the present disclosure is directed to a gas turbine engine including at least one trap that absorbs or adheres to calcium-magnesium-alumino-silicate (CMAS) entrained in intake air entering the engine.

In a gas turbine engine with an intake air flow path, in another aspect the present disclosure is directed to a method for removing CMAS entrained in the intake air. The method includes inserting a CMAS trapping element in the intake air flow path.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
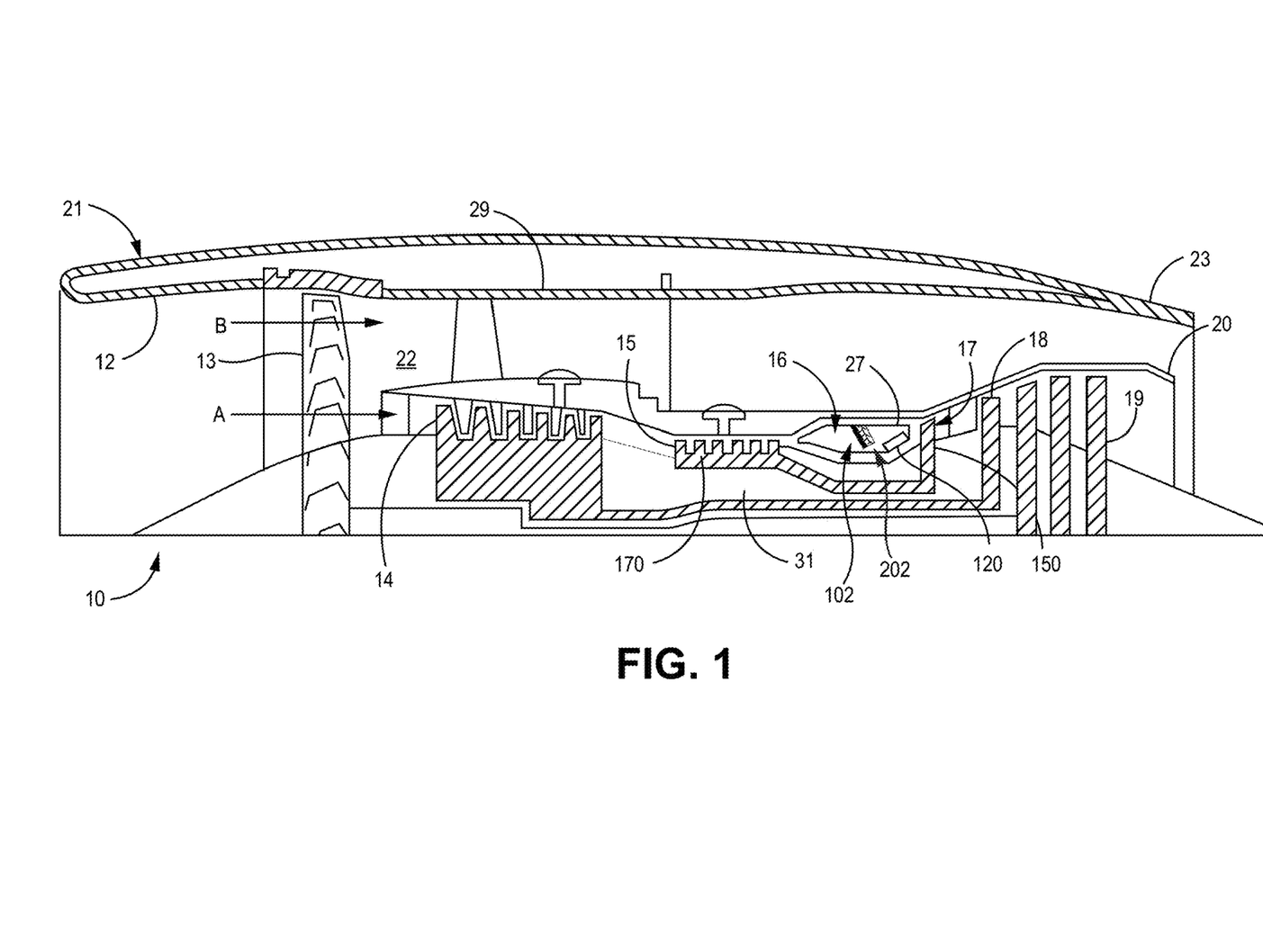
FIG. 1 is schematic cross-sectional view of an embodiment of a gas turbine engine which includes schematic depictions of certain embodiments of the CMAS traps of the present disclosure.

Referring to FIG. 1, an example of a ducted fan gas turbine engine (e.g. a jet engine) generally indicated at 10 has a principal and rotational axis 11. The engine 10 includes, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and a core exhaust nozzle 20. A nacelle 21 generally surrounds the engine 10 and includes an interior surface 29 that defines the intake 12, a bypass duct 22 and an exhaust nozzle 23.

The gas turbine engine 10 works in the conventional manner so that air entering the intake 12 is accelerated by the fan 13 to produce two air flows: a first airflow A into the intermediate pressure compressor 14 and a second airflow B which passes through the bypass duct 22 to provide propulsive thrust. Airflow A entering the intermediate pressure compressor 14 is compressed before being delivered to the high pressure compressor 15, where further compression takes place.

The compressed air exhausted from the high-pressure compressor 15 is directed into the combustor 16, mixed with fuel, and the mixture combusted. The resultant hot combustion products then expand through and drive the high, intermediate and low pressure turbines 17, 18, 19, before being exhausted through a primary nozzle 20 to provide additional propulsive thrust. The high, intermediate and low-pressure turbines 17-19, respectively, drive the high and intermediate pressure compressors 15, 14 and the fan 13 by suitable interconnecting shafts.

In some examples, the turbofan engine 10 can be used to provide power to an aircraft (not shown in FIG. 1). As used herein, the term aircraft includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the devices of the present disclosure may be used in other applications that may not be coupled with an aircraft such as, for example, industrial applications, power generation, pumping sets, naval propulsion, weapon systems, security systems, perimeter defense/security systems, and the like.

As discussed above, in many cases CMAS particles are entrained in the airflows A and B. As these airflows A, B traverse the engine along an airflow path, and flow downstream from the compressor section, to the combustion section, and then into the turbine section, engine components interacting with the airflow along the flow path can be eroded or damaged. If the engine components operate at higher temperatures such as, for example, in the combustor 16 or in the turbines 17-19 downstream of the combustor 16, the entrained CMAS particles can melt and adhere to the exposed external surfaces of the engine components.

The present disclosure is directed to CMAS traps that can absorb, adhere to, resist penetration of, or filter, CMAS from the intake airflows. By removing CMAS from the intake air flow and preventing CMAS damage to critical engine components, the CMAS traps of the present disclosure can extend engine life and make possible higher engine temperatures and greater engine efficiency.

The CMAS traps of the present disclosure may be located in any portion of the gas turbine engine, and may be placed in any or all of the compression section, the combustion section, or the turbine section. In some examples, the CMAS trap is a diverter placed in the intake air flow path that includes a CMAS-susceptible or CMAS-adhering coating, or a CMAS filter. In other examples, the CMAS trap is a CMAS-susceptible, a CMAS-adhering, or a CMAS-resisting coating on an engine component, or a specific portion of an engine component, that interacts with the flow path such as, for example, an internal surface of the combustor 16, or an external surface of a compressor vane or a turbine vane. In some examples, the engine component on which the CMAS trap is applied may optionally be heated to raise the temperature of the CMAS-susceptible or CMAS-adhering coating to a predetermined temperature selected to more effectively trap the entrained CMAS as the intake air traverses the engine component.

Referring again now to FIG. 1, a CMAS trap such as a diverter 102 may extend from an internal wall 27 of the combustor 16 into the gas stream within the combustor 16. As shown in detail in FIG. 1A, which is provided for the purposes of illustration and is not to scale, the diverter 102 includes a substrate 106 affixed to the wall 27 of the combustor 16. The substrate 106 may be made of any suitable high temperature resistant material such as, for example, a superalloy, a ceramic matrix composite (CMC), and the like, and may include single or multiple layers. The substrate 106 includes a surface 107 having thereon a coating 104 including at least one layer that is configured to absorb, adhere to, resist penetration of, or filter out, CMAS entrained in the intake stream A (FIG. 1).

Figure 1A:
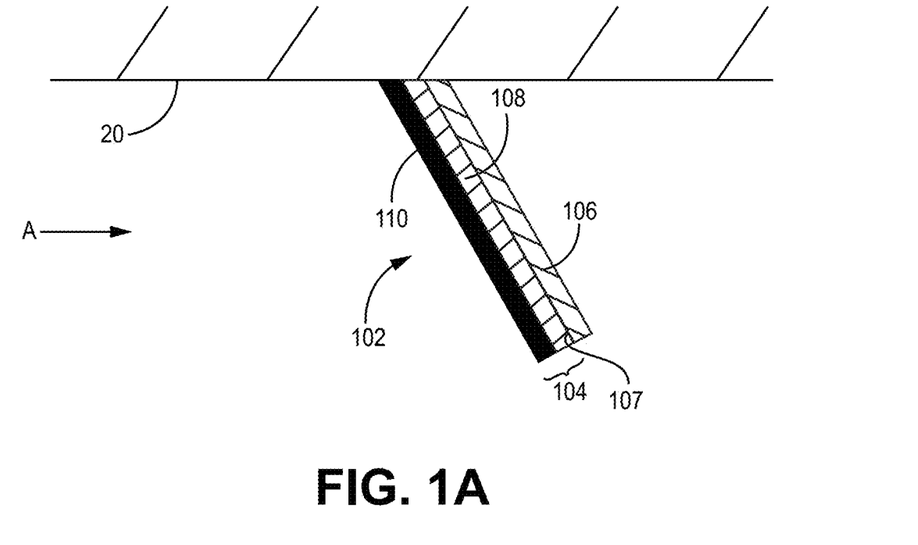
FIG. 1A is a schematic cross-sectional view of an example of a CMAS trap placed in a combustor of the engine of FIG. 1.

In the example of FIG. 1A, the coating 104 includes a first layer 108 directly on the surface 107, which may be an environmental barrier coating, a thermal barrier coating, or a combination thereof. The coating 104 further includes a layer 110, which may include at least one CMAS-susceptible, CMAS-adherent, or CMAS-resistant coating.

In the present application, the term CMAS-resistant coating refers to coatings that resist penetration of CMAS, or into which CMAS is slow to infiltrate. In some examples, the surface of the CMAS-resistant coating has a high wetting angle for CMAS, and CMAS tends to pool on the surface without infiltrating the coating. In some examples, CMAS reacts very quickly with a surface of a CMAS-resistant coating, which slows CMAS infiltration into the areas of the coating layer below the surface. In some examples, a CMAS-resistant coating can have a high thermal gradient across the coating, which can slow CMAS infiltration into the coating layer.

In the present application, the term CMAS-susceptible coating means a coating of a material that is capable of absorbing CMAS, or chemically reacting with CMAS, and by absorption or reaction (or both), removing the CMAS from a gas stream incident on the coating under the conditions of temperature, pressure, and the like, where the CMAS trap operates in the gas turbine engine. In some examples, the CMAS-susceptible coating has good wetting behavior for CMAS, and the CMAS infiltrates rapidly without pooling on the surface. In some examples, the CMAS-susceptible coating continues to gradually absorb CMAS over time, gradually altering the microstructure of the coating layer. In some examples, the CMAS-susceptible coating continues to absorb CMAS until the coating layer is fully saturated with CMAS. In some examples, a change in mechanical compliance in the fully saturated coating may cause the saturated coating to fracture or flake off the substrate 106 or underlying coating layers, and the change can be detected in routine engine inspections.

In this application, CMAS-adherent coating refers to coating layers having an exposed surface to which CMAS readily bonds, or adheres to, under the operating conditions for the area of the gas turbine engine where the CMAS trap is located. In some examples, molten CMAS can adhere to a surface of a CMAS-adherent coating. Instead of impacting, eroding, or continuing down the engine to melt and react in the turbine section, the CMAS is captured on a CMAS trap and removed from the intake air stream. Like the CMAS-resistant coating, in some examples, the CMAS-adherent coating refers to coatings into which CMAS is slow to infiltrate and has a high wetting angle for CMAS, reacts quickly with CMAS, or has a high thermal gradient that slows CMAS infiltration into the coating layer.

In some examples, the CMAS-susceptible, CMAS-adherent, or CMAS-resistant coating 110 can be present on the substrate 106 in single or multiple layers. As shown schematically in FIG. 1B, in some examples, the CMAS-susceptible coating 110 can be present as CMAS-susceptible layers 112 alternating with CMAS-resistant coating layers 114, which are referred to herein a CMAS-resistant layers. In this application CMAS-resistant layer refers to a layer of a material that does not absorb, or chemically react with, the CMAS entrained in the engine intake air under the conditions at which the CMAS trap operates. Instead, when CMAS encounters a CMAS-resistant layer or coating, the CMAS does not penetrate or initially react with the layer, but instead collects or pools on the surface. Of course, over time, the CMAS may gradually penetrate, react with, or adhere to the CMAS-resistant layer, but such absorption or reaction is very slow compared to the CMAS-susceptible and CMAS-adherent coatings, and may be dependent on operating conditions such as temperature, pressure, operating environment humidity, and the like.

In some examples, the CMAS-susceptible coating includes rare earth silicates such as ytterbium disilicate (YbDS), ytterbium monosilicate (YbMS), and the like, additives such as, for example, MgO, MgAlO, HfSiO, Mo, $MoSi_2$, SiAlON, $Al_2O_3$, GdZrO, as well as mixtures and combinations of these materials. In some examples, the CMAS-susceptible coating can include MgO, MgAlO, HfSiO, Mo, $MoSi_2$, SiAlON, $Al_2O_3$, GdZrO, as well as and mixtures and combinations of these materials.

In some examples, CMAS-adherent coatings are chosen from GdZrO, YbDS, YbMS, YMS, YDS, RE monosilicate, rare earth disilicate, a CMAS tolerating coating, and mixtures and combinations thereof.

Figure 1B:
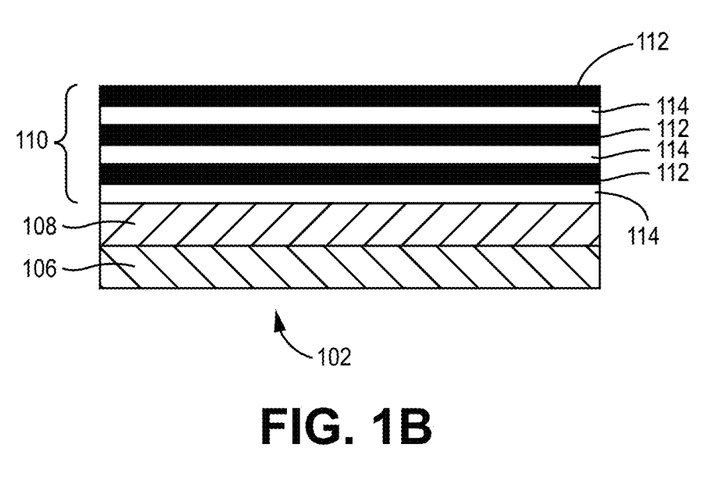
FIG. 1B is a schematic cross-sectional view of an example of a coating layer for the CMAS trap of FIG. 1A.
Figure 1C:
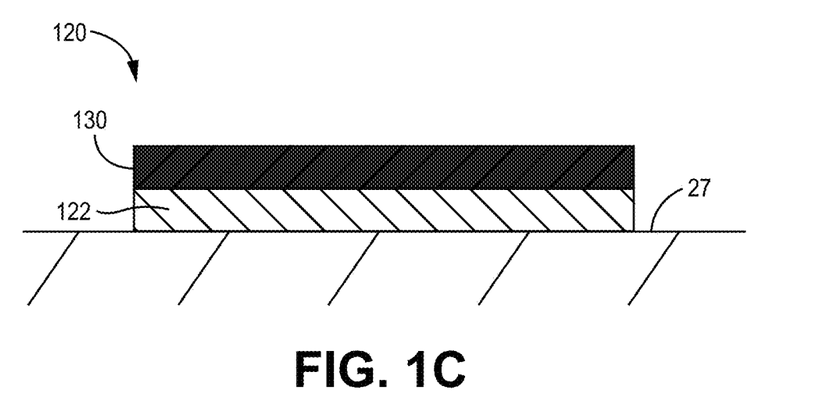
FIG. 1C is a schematic cross-sectional view of a coating on a wall of the combustor of the engine of FIG. 1.

In another example shown schematically in FIG. 1C, a coating 120 on a surface of an engine component such as, for example, an internal wall 27 of the combustor 16 (FIG. 1) can serve as a CMAS trap. The coating 120 can optionally include an EBC/TBC layer 122, as well as one or more of a CMAS-susceptible, CMAS-adherent, or CMAS-resistant layer 130. As noted above, the CMAS-adherent layer 130 may include a single layer as shown in FIG. 1C, or multiple layers of CMAS-susceptible/adherent and CMAS-resistant layers as shown in FIG. 1B discussed above.

Referring again to FIG. 1, the high pressure turbine 17 in the gas turbine engine 10 includes a number of turbine blades 150. As shown in detail in FIG. 1D, in another embodiment turbine blade 150 includes an airfoil 151, a platform 152, a root 153, and a tip 154. A surface 155 on a pressure side of the turbine blade 150 includes a CMAS trap 156. For example, the CMAS trap 156 may be a coating on all or a portion of the surface 155, or may include any of the coating layers described above. In one example, the CMAS trap 156 includes a TBC/EBC directly on the surface 155, which is overlain by an arrangement of CMAS-susceptible layers, CMAS-adherent layers, CMAS-resistant layers, and combinations thereof.

Figure 1D:
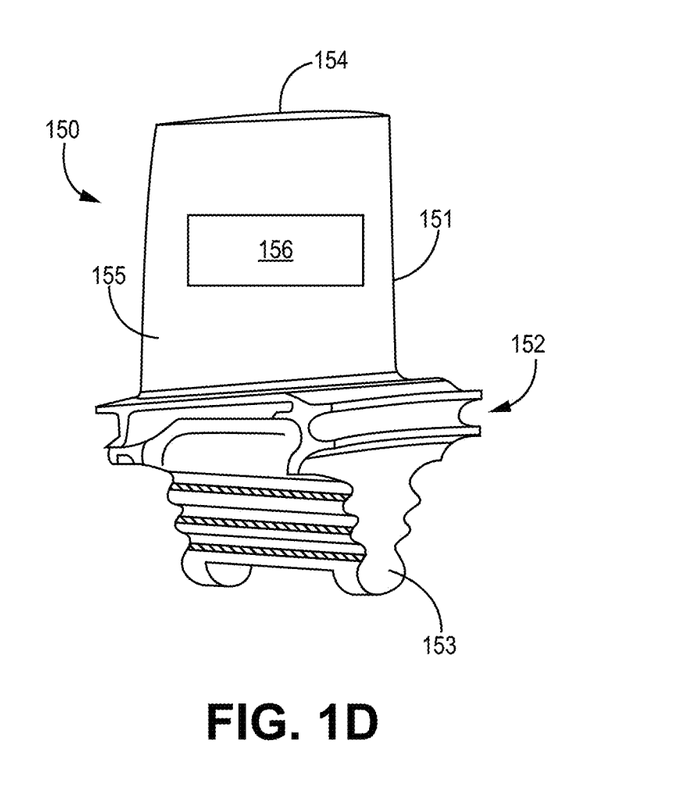
FIG. 1D is a schematic plan view of a turbine vane in the high pressure turbine of the engine of FIG. 1.

Since the high pressure turbine 17 in the gas turbine engine 10 is directly downstream of the combustor 18, the turbine blade 150 in the high pressure turbine 17 is exposed to high temperatures. In some cases, CMAS entrained in the engine intake air is molten when the CMAS contacts the CMAS trap 156, and adheres to a surface thereof. In other examples, when the CMAS contacts the CMAS trap 156 at the high temperatures in the high pressure turbine 17, the CMAS trap 156 can more readily absorb the CMAS. The CMAS trap 156 can also protect the surface 155 of the turbine blade from erosion caused by entrained CMAS, and can be formed in a desired shape, or located on any portion of the surface 155.

The example CMAS traps shown in FIGS. 1A-1D above are only provided as examples, and one or more CMAS traps can be placed in any selected location within the combustor 18, the high pressure turbine 17, the medium pressure turbine 18, or the low pressure turbine 19 (FIG. 1). In some examples, the CMAS trap can be used to modify existing parts, can be added to existing parts, or can be used to replace parts in the combustor or the turbine sections of the gas turbine engine.

Referring again to FIG. 1, the compressor section of the gas turbine engine 10 includes an intermediate pressure compressor 14 and a high pressure compressor 15. The high pressure compressor 15 includes an arrangement of compressor vanes 170. Upstream of the high pressure compressor 15, temperatures are still below CMAS melting temperatures, and an important concern is erosion with sand/dust entrained in the gas stream. However, in some cases it can be desirable to remove entrained CMAS before the CMAS reaches the hotter sections of the engine in the combustor 18 and the turbines 17-19. As shown in the schematic diagram of FIG. 1E, the compressor vanes 170 in the high pressure compressor 15 include rotor blades 172 and stator blades 174. In one example, all or a portion of the blades 172, 174 can include an external coating 176 of a CMAS-susceptible coating, a CMAS-adherent coating, or a CMAS-resistant coating, or a combination thereof. The coating 176 may be on all or a portion of the blades 172, 174 in the intermediate pressure compressor 14 or the high pressure compressor 15.

Figure 1E:
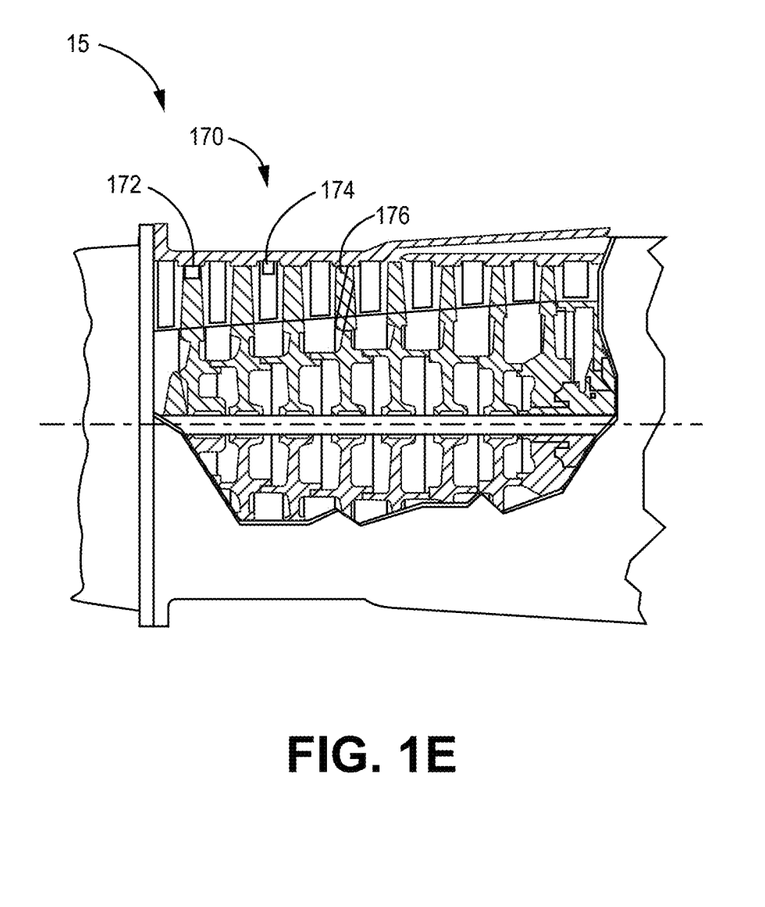
FIG. 1E is a schematic internal side view of a high pressure compressor section of the engine of FIG. 1.

In some examples, since the compressors 14, 15 operate in a relatively low temperature environment in the engine, a surface of the blade 172, 174 underlying the coating 176 may optionally be heated to a temperature selected to maximize CMAS capture. Instead of impacting and eroding parts, or continuing down the engine to melt and react in the combustor 18 or the turbine section 17-19, the heated coating 176 captures CMAS on a less sensitive part that operates at an overall lower temperature. In some cases, CMAS resistance in the compressor section at 1300° C. can be an easier and longer term problem to manage with a CMAS trap than CMAS resistance at 1400° C. in the combustor 18 or the high pressure turbine 17.

In one example, the inlet temperature for the turbines 17-19 can be derived as a maximum that materials will allow with or without CMAS. By heating a component in the compressor 14 or 15, the turbine inlet temperature can be selected to maximize CMAS capture and CMAS resistance, or may be made optimal for a certain CMAS behavior.

In other examples, the individual components of the compressor section and the coating 176 may be heated in a wide variety of ways. For example, the compressors 14, 15 can be configured to increase intake air flow temperatures to a temperature such that the coating 176 can effectively absorb or adhere to CMAS. In such cases, the high pressure compressor 15 could also function as a combustor gas pre-heater, which could potentially improve engine efficiency.

In another example, the blades 172, 174 can be heated with a resistive heating element, with bleed air from the turbines 17-19, with electromagnetic radiation, and combinations thereof, to produce a surface temperature in the coating 176 greater than a CMAS melting temperature. The selected temperature can be varied geographically based on the region of the operation of the gas turbine engine, or can be selected using in-situ chemistry testing. Based on engine operating conditions and test results, in some examples the heaters for the coating 176 can be turned on and off as needed to more effectively capture CMAS. For example, the heating elements for the coating 176 can be turned off for cruise or high altitude engine operation where less CMAS is entrained in engine intake air.

In some examples, the portion of the blade 172, 174 underlying the coating 176 can be made of a material such as a thermally inductive material, or a material with a reverse thermal gradient, to allow more effective and rapid heating of the coating 176 to trap CMAS. In some examples, which are not intended to be limiting, the blades 172, 174, or a portion of the blades 172, 174 underlying the coating 176, may be made from a CMC with an EBC (for example, YbMS or YbDS), or a superalloy with a TBC (for example, GdZrO).

By heating a compressor stage (preferably the blades in the high pressure compressor 15). CMAS can be captured in a more controlled and favorable environment.

Figure 2:
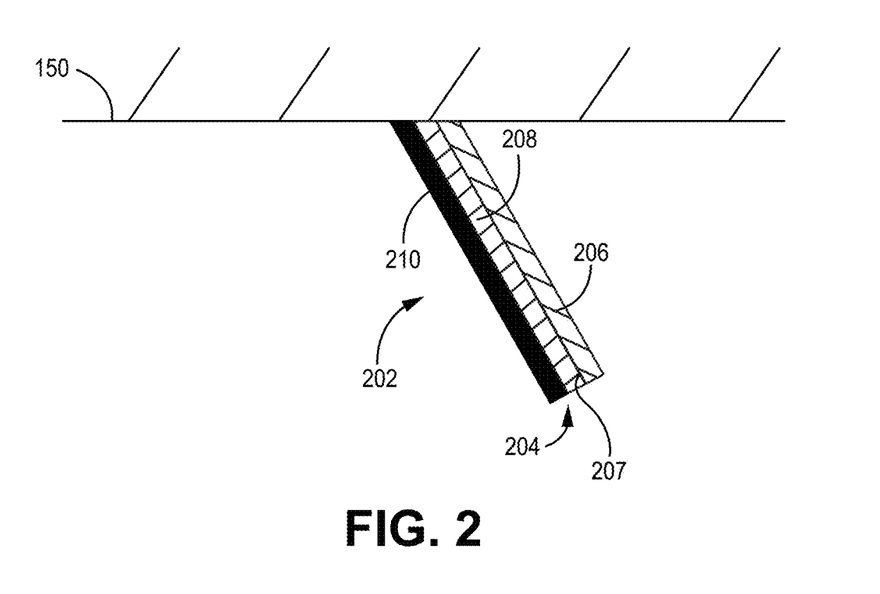
FIG. 2 is a schematic cross-sectional view of a diverter placed in cooling air entering the engine of FIG. 1, wherein the diverter may include a CMAS trapping coating or a CMAS filter.

Referring again to FIG. 1, in another example, a diverter 202 may be positioned in the cooling airstream within the gas turbine engine 10, which in some cases travels approximately down the shafts of the compressors 14, 15. As shown in the example of FIG. 2, which is provided for the purposes of illustration and is not to scale, the diverter 202 includes a substrate 206 affixed to an internal wall 31 of the engine nacelle 21. The substrate 206 may be made of any suitable high temperature resistant material such as, for example, a superalloy, or a CMC, and may include single or multiple layers. The substrate 206 includes a surface 207 having thereon a coating 204 including at least one layer that is configured to absorb, adhere to, or filter out, CMAS entrained in the cooling air stream. In FIG. 2, the coating 204 includes a first layer 208 directly on the surface 207, which may be an EBC, a TBC, or a combination thereof. The coating 204 further includes a layer 210, which may include at least one CMAS-susceptible or CMAS-adherent coating.

The coating 210 can include single or multiple layers, and in some examples can include CMAS-susceptible or CMAS-adherent layers alternating with CMAS-resistant layers (see for example, FIG. 1B).

In some examples, the surface 207 may optionally be heated to further enhance absorption of CMAS or adherence of CMAS to the layer 210. CMAS in the cooling air flow impacts and melts on contact and adheres to the heated layer 210, and is thus prevented from flowing to and melting in and on hot section parts. In some examples, the diverter 202 is located on an exterior portion of the engine 10 for easy inspection and replacement.

In some examples, the layer 210 may be a solid particulate filter with a mesh size selected to trap and remove CMAS particles. In such an example, the underlying layers 208, 206 can be configured to provide flow through the layer 210. Since the particulate filter 210 is outside the engine on the wall 31 of the engine nacelle 21 (FIG. 1), the filter 210 is easily serviceable and can be routinely replaced during engine inspection or when airflow therethrough becomes restricted.

The devices of the present disclosure will now be further described in the following non-limiting examples.

EXAMPLES

Example 1

Figure 3:
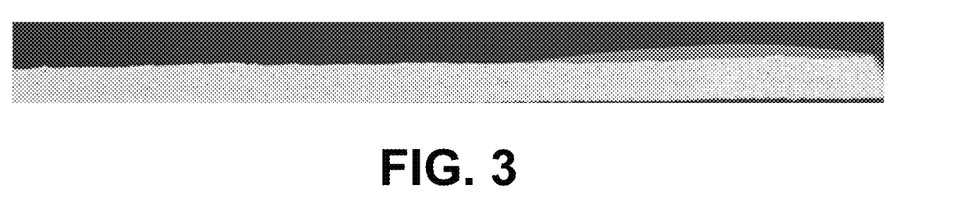
FIG. 3 is a photograph of a cross-section of a CMAS-resistant coating of Example 1.

A coupon with a CMAS-resistant coating of ytterbium disilicate (YbDS) was heated to about 1400° C., and a sample of CMAS was applied to the coating. The cross-sectional photograph of FIG. 3 shows that on the CMAS-resistant coating, CMAS wet and pooled on the surface, and did not penetrate the coating layer.

Example 2

Figure 4:
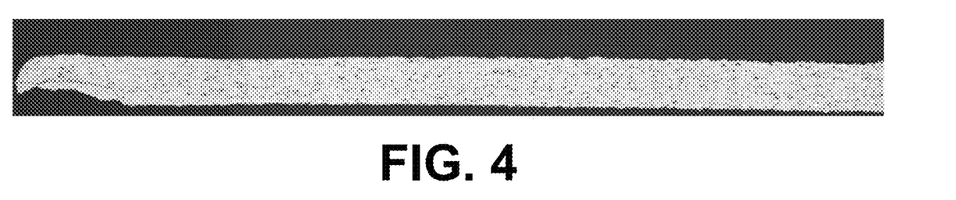
FIG. 4 is a photograph of a cross-section of a CMAS-susceptible coating of Example 2.
Figure 5:
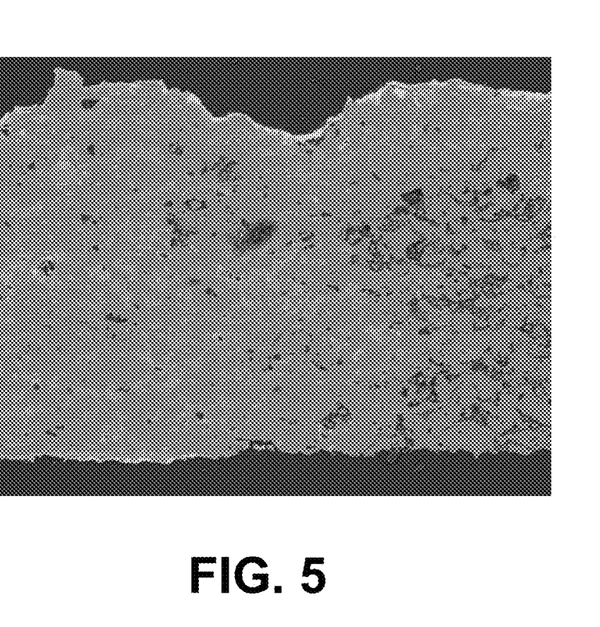
FIG. 5 is a photograph of a portion of the cross-section of the CMAS-susceptible coating of Example 2.

A coupon with a CMAS-susceptible coating of MgAlO was heated to about 1400° C. and the same amount of CMAS was applied to the coating as in Example 1. As shown in the cross section of FIG. 4, the CMAS did not pool and collect on the surface as in Example 1, but was readily absorbed into the coating layer. A difference in the coating microstructure was observable in FIG. 4, as well as in the magnified photograph of FIG. 5. In FIG. 5, the microstructure in the bottom right corner and the top surface and left side are fully penetrated by CMAS.

Example 3

Figure 6:
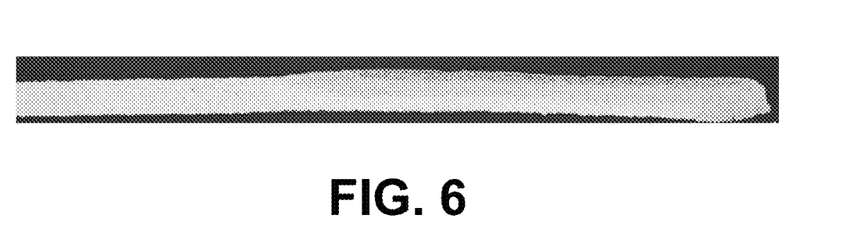
FIG. 6 is a photograph of a cross-section of a CMAS-susceptible coating of Example 3, tested for CMAS absorption at 1400° C.
Figure 7:
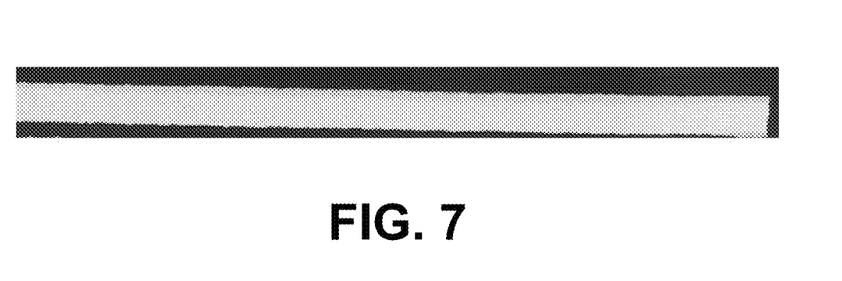
FIG. 7 is a photograph of a cross-section of a CMAS-susceptible coating of Example 3, tested for CMAS absorption at 1300° C.

Coupons with a CMAS-resistant coating of GdZrO were tested for CMAS penetration at two different temperatures, 1400° C. (photo of cross section in FIG. 6) and 1300° C. (photo of cross section in FIG. 7). The same amount of CMAS was placed on each coating sample. FIG. 6 shows more aggressive and local CMAS penetration and reaction at the higher temperature, while FIG. 7 shows slower and more uniform penetration and reaction at the lower temperature.

Various embodiments of the invention have been described. These and other embodiments are within the scope of the following claims.

The invention claimed is:

1. A gas turbine engine comprising:
   a combustor; and
   at least one trap, within the combustor, that absorbs or adheres to calcium-magnesium-alumino-silicate (CMAS) entrained in intake air entering the engine, wherein the at least one trap comprises an airflow diverter attached to an internal wall of the combustor, wherein the airflow diverter projects into an air flow path through the combustor, and wherein the airflow diverter comprises a CMAS-susceptible coating or a CMAS-adherent coating.

2. The gas turbine engine of claim 1, wherein the at least one trap comprises a CMAS-susceptible coating or a CMAS-adherent coating on at least a portion of a wall within the combustor.

3. The gas turbine engine of claim 1, wherein the at least one trap comprises a CMAS-susceptible coating or a CMAS-adherent coating downstream of the combustor.

4. The gas turbine engine of claim 3, wherein the CMAS-susceptible coating or a CMAS-adherent coating is on a turbine vane in a turbine section of the engine downstream of the combustor.

5. The gas turbine engine of claim 4, wherein the CMAS-susceptible coating is chosen from MgO, MgAlO, HfSiO, Mo, MoSi$_2$, SiAlON, Al$_2$O$_3$, GdZrO, rare earth silicates, and mixtures and combinations thereof.

6. The gas turbine engine of claim 5, wherein the rare earth silicates are chosen from YbDS, YbMS, and mixtures and combinations thereof.

7. The gas turbine engine of claim 1, wherein the CMAS-susceptible coating comprises multiple layers of alternating CMAS-susceptible layers and CMAS-resistant layers.

8. The gas turbine engine of claim 1, wherein a component of the at least one trap is within a compressor section in the engine, and upstream of the combustor in the engine.

9. The gas turbine engine of claim 8, wherein the component of the at least one trap comprises a CMAS-susceptible coating or the CMAS-adherent coating is on a surface of at least one compressor vane, or a portion thereof.

10. The gas turbine engine of claim 9, wherein at least a portion of the surface of the compressor vane is heatable to a predetermined surface temperature selected to maximize at least one of absorption of CMAS or adhesion to CMAS.

11. The gas turbine engine of claim 10, wherein the compressor vane comprises a resistive heating element configured to heat the surface of the compressor vane underlying at least one of the CMAS-susceptible coating or the CMAS-adherent coating to the predetermined surface temperature.

12. The gas turbine engine of claim 1, wherein the intake air comprises cooling air for a combustor section or a turbine section of the engine, wherein the at least one trap comprises a heated diverter in a flow path of the cooling air, and wherein a surface of the diverter is heatable to a predetermined surface temperature greater than a CMAS melting temperature.

13. In a gas turbine engine comprising an intake air flow path and a combustor, a method for removing CMAS entrained in the intake air, the method comprising:
inserting a CMAS trapping element in the intake air flow path, wherein the CMAS trapping element comprises an airflow diverter attached to a wall within the combustor, wherein the airflow diverter projects into an air flow path through the combustor, and wherein the airflow diverter comprises a CMAS-susceptible coating or a CMAS-adherent coating.

14. The method of claim 13, wherein the CMAS trapping element comprises a CMAS-susceptible coating or a CMAS-adherent coating on at least a portion of a wall within the combustor.

15. The method of claim 13, wherein the CMAS trapping element further comprises a CMAS-susceptible coating or a CMAS-adherent coating on a turbine vane, a compressor vane, or portions thereof.

16. The method of claim 15, comprising heating at least a portion of a surface of the compressor vane or the turbine vane to a predetermined surface temperature.

* * * * *